United States Patent [19]
Cloup

[11] 3,912,021
[45] Oct. 14, 1975

[54] DRILLING AND BORING HEADS

[76] Inventor: Jean Cloup, 3360 Latresne, France

[22] Filed: Nov. 29, 1973

[21] Appl. No.: 420,317

[30] Foreign Application Priority Data
Dec. 27, 1972 France .............................. 72.46447

[52] U.S. Cl. .................. 173/46; 173/163; 408/126; 92/12.2
[51] Int. Cl.² ...................... B23B 47/08; E21C 1/02
[58] Field of Search .................... 408/124, 126, 130; 173/163, 46; 91/504, 505; 92/12.2

[56] References Cited
UNITED STATES PATENTS

| | | | |
|---|---|---|---|
| 2,392,980 | 1/1946 | Fawkes | 92/12.2 X |
| 2,813,517 | 11/1957 | Sedwick | 173/163 |
| 3,230,893 | 1/1966 | Hann et al. | 91/505 |
| 3,648,567 | 3/1972 | Clark | 91/505 |

Primary Examiner—Gil Weidenfeld
Attorney, Agent, or Firm—Stevens, Davis, Miller & Mosher

[57] ABSTRACT

A drilling or boring head in which the chuck has an element which presets the speed of rotation of the drilling head by means of a variable speed control system responsive to the presetting element of the chuck.

4 Claims, 3 Drawing Figures

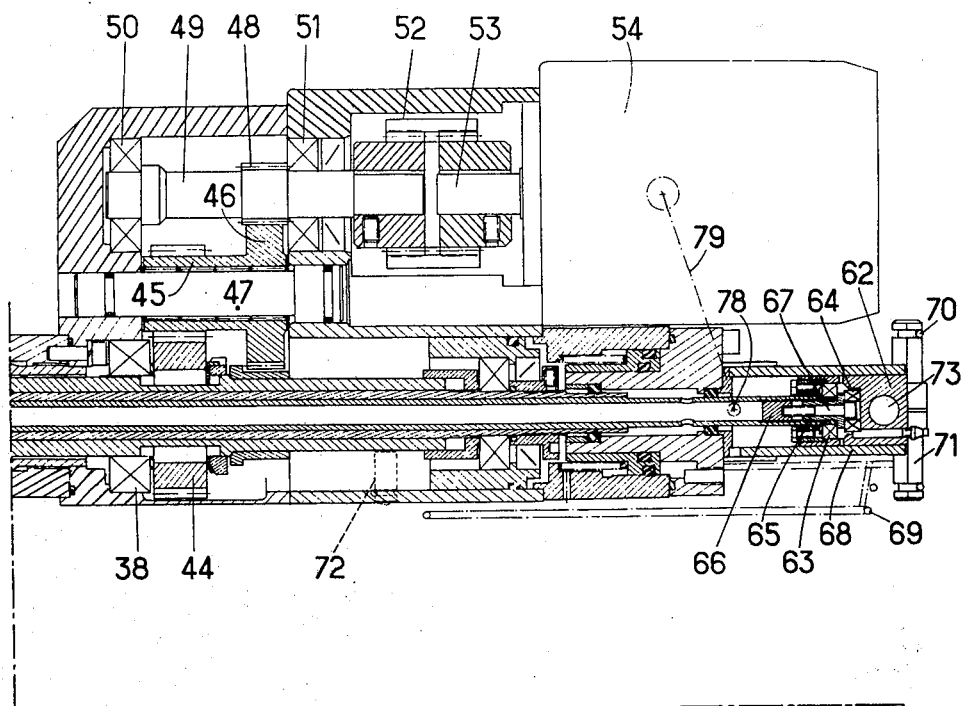
Fig. 2
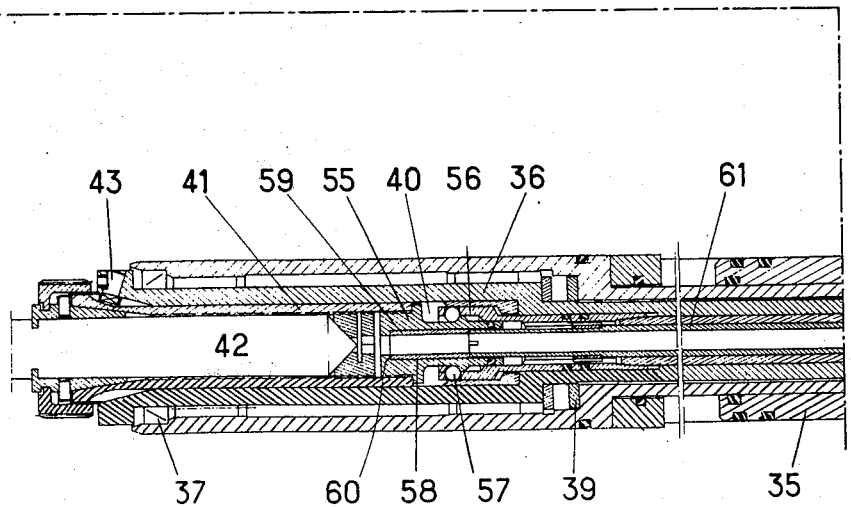

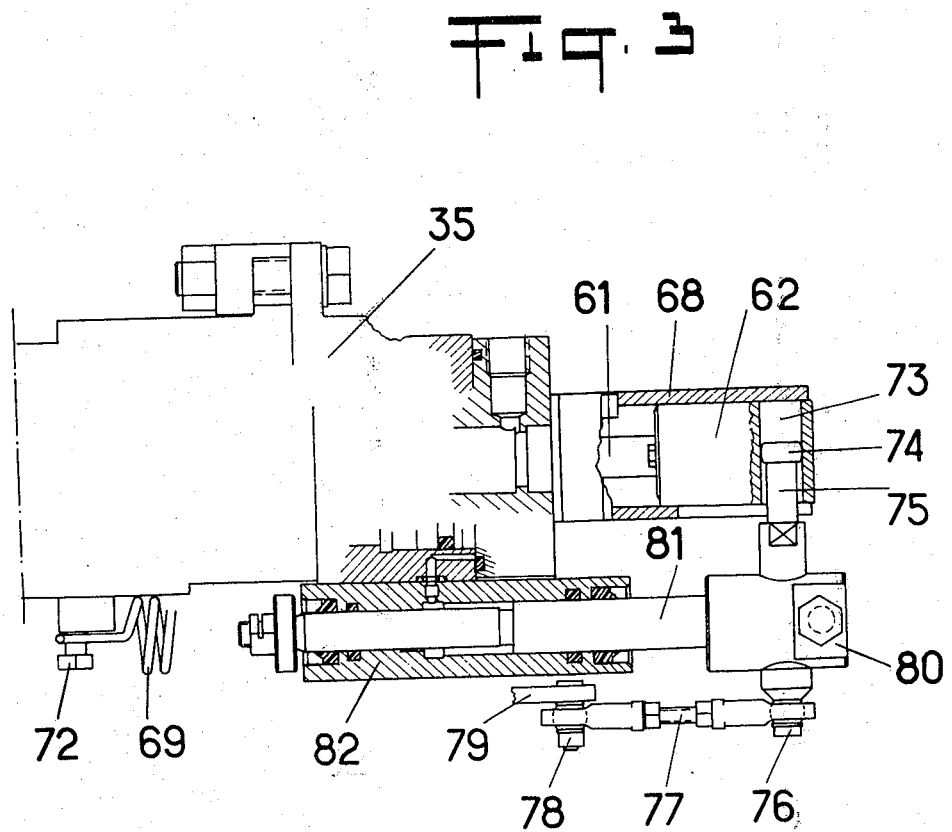

DRILLING AND BORING HEADS

The present invention relates to an improvement in drilling and boring heads.

In known drilling heads it is necessary to regulate the speed of the motor driving the spindle to which the drill chuck is secured as a function of the drill diameter and of the type of metal to be machined.

It is an object of the present invention to provide means for controlling the rate at which the spindle connected to the drill chuck rotates, said control means being responsive to a characteristic of the particular chuck fitted.

It is a further object to ensure that when a particular type of drill is fitted to the drilling head the speed of rotation is automatically set to the desired value.

It is yet a further object to provide the drill chuck with a member of adjustable length cooperating with means adapted to set the drill chuck to rotate at a specific angular speed, which is a function of the length of said member.

Other objects and advantages of the invention will become apparent from reading the following description referring to the accompanying drawings in which:

FIG. 2 is a view in longitudinal section through a further embodiment of a drilling head; and FIG. 3 is a detailed view showing the rear portion of the drilling head of FIG. 2.

Figure 1:
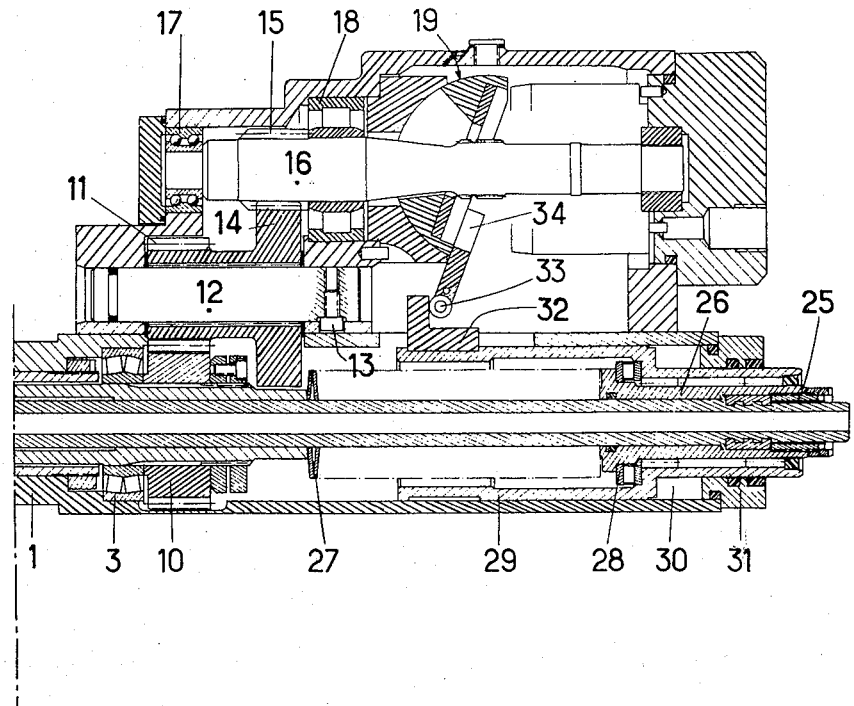
FIG. 1 is a view in longitudinal section through a first embodiment of a drilling head according to the invention.
Figure 1:
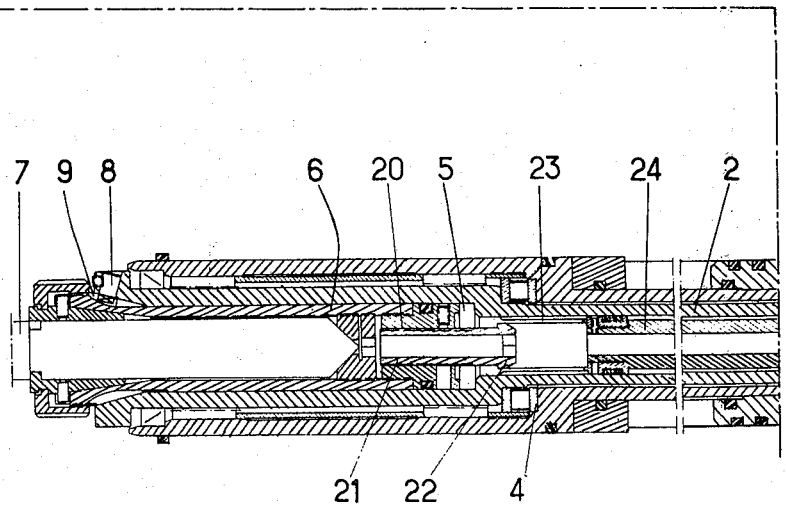

The drilling head shown in FIG. 1 comprises a body 1 enclosing a hollow spindle 2 supported therein by means of a ball bearing 3 and a thrust ball bearing 4.

At one of its ends the spindle 2 has a socket 5 adapted to receive a chuck 6 carrying a drill 7, the chuck 6 being held for rotation with the spindle 2 by means of a grub screw 8 engaged in a slit 9 of the chuck.

At its other end, the spindle 2 is integral with a pinion 10 meshing with a double pinion 11 rotatably mounted on a shaft 12 fixed to the body 1 of the drilling head by means of a screw 13. The double pinion 11 has further toothing 14 meshing with teeth 15 provided on a shaft 16 rotatably mounted in the body 1 by means of ball bearings 17, 18. The shaft 16 is driven by a hydraulic motor 19.

The drill chuck 6 has a tapped bore 20 into which a hooking stem 21 is screwed in adjustable manner, the end 22 of the hooking stem being engaged in a clamp 23 integral with one end of the hollow rod 24 which is slidably mounted within the spindle 2. At its other end the hollow rod 24 is integral, via a threaded sleeve 25, with an abutment member 26 against which bears at one side a stack of spring washers 27 received on the hollow rod 24; the other side of the stack of spring washers is supported by the spindle 2. The abutment member 26 bears through the intermediary of a thrust bearing 28 on a piston 29 slidably mounted in the body 1 and subjected at one of its faces to the action of hydraulic fluid directed into a chamber 30 provided between the piston and the end cap 31 of the body 1.

The piston 29 carries a bush 32 to which a swash plate 34 of the hydraulic motor 19 is fitted for pivoting about axis or spindle 33, the swash plate inclination determining the speed of the motor.

Adjustment of the speed of the drilling head is effected in the following manner:

The length of the hooking stem 21 is first regulated by threadedly moving it in the chuck 6. Upon insertion of the chuck 6 in the drilling head, the hooking stem 21 is hooked in the clamp 23 and the resilient washers 27 exert a pull on the hollow rod 24 through the intermediary of the abutment member 26, to hold the piston 29 in a position which depends on the length of the hooking stem 21 and consequently the swash plate 34 of the hydraulic motor 19, connected to the piston 29 via the spindle 33 of the bush 32, is held in a corresponding position.

Now, since the inclination of the swash plate 34 of the motor 19 determines the speed of the motor, it follows that the speed of the spindle 2 is controlled as a function of the length of the hooking stem 21.

Furthermore, it is possible to eject the drill 7 by introducing fluid under pressure into the chamber 30 so as to compress the resilient washers 27 and expel the drill chuck 6 via the hollow rod 24.

FIGS. 2 and 3 show a further embodiment of a drilling head comprising a body 35 enclosing a hollow spindle 36 mounted by means of ball bearings 37, 38 and a thrust bearing 39.

At one of its ends the spindle 36 has a socket 40 to receive a chuck 41 carrying a drill 42, the said chuck being fixed to the spindle by a screw 43.

The other end of the spindle 36 has a pinion 44 keyed thereto and enmeshed with a double pinion 45 rotatably mounted on a shaft 47 and secured to the body 35 of the drilling head, the said pinion 45 having further teeth 46 meshing with teeth 48 fashioned on a shaft 49 which is rotatably mounted in the body of the drilling head by means of ball bearings 50,51. The shaft 49 is connected to the output shaft 53 of a hydraulic motor 54 by a coupling sleeve 52.

On the chuck 41 there is screwed a hooking stem 55 engaged in a sleeve 56 integral with the spindle 36 and locked by means of balls 57 fitted in the sleeve 56 and engaged in housings of the hooking stem 55.

The hooking stem 55 has a bore 58 within which is a collar 59 resting against a shoulder 60, the said collar 59 being capable of having different lengths according to the spindle speed one desires to obtain.

One end of a hollow rod or probe 61 bears on the collar 59 and the other end is integral with a slide 62 to which the hollow rod 61 is fitted through the intermediary of a ball bearing 63 and a thrust bearing 64 by means of sleeves 65 and 66 and a screw 67.

As shown in FIG. 3 slide 62, slidably mounted in a tube 68 integral with the body of the drilling head, is subjected to the action of springs 69, 70 which are attached at one side to a rod 71 integral with the slide 62 and at the other side to a rod 72 integral with the body of the head. The slide 62 has a bore 73 into which engages, by a spherical end 74, a rod 75 carrying a pivot pin 76 of a connecting rod 77 articulated about a shaft 78 on a lever 79 controlling the speed of rotation of the motor 54.

On the rod 75 there is pivotably mounted a head 80 integral with a piston 81 slidably mounted in a body 82 of a jack secured to the body of the drilling head.

Regulation of the speed of the spindle of the drilling head is effected in the following manner:

The collar 59 is of a specific length which can be altered by replacing by another collar of different length.

The rod or probe 61 bears on the collar 59 under the action of the springs 69, 70 which act, through the intermediary of the slide 62, on the rod or probe 61 in such manner that the slide occupies a specific position which is a function of the length of the collar 59. Since the displacement of the slide 62 is linked to that of the lever 79 to which it is connected via the connecting rod 77, the lever is given a specific position which corresponds to a specific speed of the motor 54 and consequently of the spindle 36 which is connected to the shaft of the motor via the pinions 48, 46, 45 and 44. In this way the speed of spindle 36 can be fixed by fitting to the hooking stem 55 a collar 59 of a specific length.

Furthermore, the piston 81 of the jack 82 enables the slide 62 and the rod 61 to be pushed back, counter to the springs 69, 70, so as to disengage the rod 61 from the hooking stem 55 and remove the chuck 61 and the drill.

I claim:

1. In a tool head comprising a body, a hollow spindle rotatably supported in said body, a chuck secured to one end of said spindle for rotation therewith, drive means for rotating said spindle, said drive means including variable speed motor means, control means associated with said motor means for varying the speed of said motor means according to the position of said control means, a rod slidably received in said spindle, said rod being coaxial with the chuck and axially spaced therefrom, stem means axially connecting said chuck and rod, said stem means being selectively adjustable relative to said chuck to vary the overall length of said chuck and rod, said stem means and said rod being axially slidable relative to each other and having opposed abutting surfaces, resilient means associated with said rod and said spindle to bias said opposed surfaces into engagement, means secured to said rod for axial movement therewith and being engagable with said control means for changing the position thereof according to said overall length of said chuck and rod, whereby said stem means can be selectively adjusted relative to said chuck to change said overall length of said chuck and rod and thereby change the position of the control means to vary the speed of the motor means.

2. The tool head of claim 1, wherein said rod has clamping means for clamping onto said stem means, and said stem means being threadingly connected to said chuck to provide said selective adjustment relative thereto.

3. The tool head of claim 1, wherein said means secured to said rod for axial movement therewith includes an abutment member, said motor means being hydraulically powered, said control means for said motor means including a swash plate, whereby said abutment member engages said swash plate to change the position thereof for varying the speed of said motor means.

4. The tool head of claim 1, wherein said means secured to said rod for axial movement therewith includes piston means for moving said rod against said chuck to eject same.

* * * * *